United States Patent [19]

Hulsey

[11] 4,453,361
[45] Jun. 12, 1984

[54] SCREW FASTENER ASSEMBLY, METHOD OF PROVIDING SAME, AND FASTENER SUITABLE FOR USE THEREIN

[75] Inventor: Tommy R. Hulsey, Wyomissing, Pa.

[73] Assignee: Construction Fasteners, Inc., Wyomissing, Pa.

[21] Appl. No.: 369,353

[22] Filed: Apr. 19, 1982

[51] Int. Cl.³ .......................... E04B 1/78; E04B 1/38
[52] U.S. Cl. ...................................... 52/410; 52/506; 52/573; 411/378; 411/386; 411/411
[58] Field of Search ........................ 52/410, 506, 573; 411/386, 387, 411, 424, 378, 371

[56] References Cited

U.S. PATENT DOCUMENTS

| | | | |
|---|---|---|---|
| 676,240 | 6/1901 | Latty | 411/424 |
| 2,751,052 | 6/1956 | Flora | 52/506 |
| 3,088,361 | 5/1963 | Hallock | 52/573 X |
| 3,478,639 | 11/1969 | Gruca | 411/387 |
| 3,591,876 | 7/1971 | Swindlehurst | 5/356 |
| 4,003,175 | 1/1977 | Patry | 52/506 |
| 4,074,501 | 2/1978 | Sandqvist | 52/741 |
| 4,361,997 | 12/1982 | DeCaro | 52/410 X |

FOREIGN PATENT DOCUMENTS

| | | | |
|---|---|---|---|
| 601155 | 4/1948 | United Kingdom | 411/424 |
| 1352599 | 5/1974 | United Kingdom | 411/411 |
| 2086517A | 5/1982 | United Kingdom | 411/371 |

*Primary Examiner*—Alfred C. Perham
*Attorney, Agent, or Firm*—Albert L. Free

[57] ABSTRACT

A screw for use in fastening resilient insulation to a metal building surface having threads near its tip and a reduced-diameter portion just above the threads, so that when the threaded portion has been screwed entirely through an opening in the substrate, the reduced-diameter portion of the screw is free to reciprocate in the opening and then permit compression and reexpansion of the insulation while still retaining it against lift-off.

16 Claims, 7 Drawing Figures

SCREW FASTENER ASSEMBLY, METHOD OF PROVIDING SAME, AND FASTENER SUITABLE FOR USE THEREIN

This invention relates to an assembly in which a layer of resilient material is secured to a substrate by a screw fastener, for example an assembly in which a layer of resilient thermally-insulating material is secured to a thin plate or sheet of metal; it also relates to a method of providing this assembly, and to a screw fastener for use therein. It has particular applicability to the fastening to a substrate of a resilient layer of material held to a substrate by screws, the substrate and screws being covered by a covering such as successive layers of a built-up roof.

BACKGROUND OF THE INVENTION

In the building construction industry it is common to secure a layer of thermally insulating material to a substrate, for example to a large sheet of corrugated metal. One way in which this has been accomplished is to fasten the layer to the substrate with a plurality of spaced-apart screw fasteners each extending from the outer side of the insulating layer to the opposite side of the substrate. For example, a screw, with a large apertured plate under its head serving a washer-like function, may be inserted through the insulation and screwed into and partially through the underlying substrate. In one known manner of accomplishing this, the screw fastener is of the self-piercing, self-tapping type, so that as it advances it creates its own opening in the substrate and then forms internal threads in the opening with which the external threads of the fastener engage as they are screwed through the substrate.

While adequate for many purposes, the foregoing assembly is subject to the following difficulties, particularly in the case in which the layer is of a resilient material. If the fastener is subjected to substantial and abnormal forces urging it toward the substrate, as when personnel or equipment are present on the exterior of the layer, the screw threads may be subjected to so much force that the screw fastener is forcefully advanced axially through the threaded opening, the mating threads being sufficiently deformed by the large applied force that they can slip over each other to permit such advance of the screw. During such an event, the insulating layer is compressed to a smaller thickness than its normal thickness, and when the source of the unusual force on the fastener is removed, the mating threads engage sufficiently to prevent the return of the layer to its normal thickness, as would otherwise occur. Thus a one-way action is produced whereby once the layer has been compressed in this manner, it will remain in its compressed state thereafter rather than returning to its original, desired normal thickness.

Furthermore, in many such applications this insulating layer and screws made are covered with one or more additional layers of material. For example, it is common to provide a so-called "built-up roof" or membrane over the top of a resilient insulating layer held to a substrate by screws, the membrane extending over the heads of the heads of the screws. Typically the membrane consists of a number of alternate layers of tar-impregnated felt paper and hot-mopped asphalt. If conventional screw fasteners are used in this assembly and large compressive forces, for example the weight of a person or a wheelbarrow, are applied to the top of the membrane between the screw heads, and the screw does not force its way downward through the threaded opening in the substrate, then the resilient insulation near the screw will be compressed, permitting the top membrane also to move downwardly adjacent the screw head, but the screw head will remain fixed and will tend to rupture the overlying membrane and pop upward through it, producing an undesirable source of water leakage through the membrane around the screw head.

In addition, if a conventional screw fastener is used and a large compressive force is applied downwardly on the screw head, the screw threads may be forced entirely through the threaded opening in the substrate and followed by a portion of the unthreaded shank of the screw. This can strip the threads in the opening in the substrate and/or increase the size of that opening to the size of the root of the threads, particularly where the screw threads are cut threads and the diameter of the shank is therefore as large as the root of the threads in the opening. If such an event occurs, the screw is thereafter easy to pull back up through the opening in the substrate, and the resistance to lift-off of the insulating layer and of any built-up roof on top of it is greatly reduced.

Thus when a conventional fasteners is used, compressive forces applied to the exterior of the covering can cause the insulation to be compressed and remain compressed, giving an uneven outer surface and reduced insulative properties; or can damage the substrate so that the lift-off resistance is decreased; or can cause the screw heads to pop up through the built-up roof and produce leaks. All of these are undesirable.

Accordingly, it is an object of the invention to provide a new and useful screw fastener, a new and useful assembly using a screw fastener to fasten a resilient layer, and a new and useful method of providing said assembly.

It is also an object to provide such a screw fastener, assembly and method of assembly which permits compression and reexpansion of a resilient layer held by the fastener, and mitigates the possibility of rupture of a covering overlying the head of the fastener when the resilient layer adjacent the fastener is compressed.

BRIEF SUMMARY OF THE INVENTION

The above described difficulty is overcome according to the present invention, by means of a screw fastener having threads adjacent its tip portion which are larger in maximum diameter than the minimum diameter of the corresponding aperture in the substrate, the threads terminating at the outer side of the substrate, and the portion of the screw shank passing through the opening in the substrate and extending a substantial distance into the insulating layer being of lesser maximum diameter so that it can move with comparative ease through the opening in the substrate. Thus when the insulating layer has its normal thickness, the inner termination of the threads serves as a stop preventing the screw from moving in the direction which would withdraw it from the aperture in the substrate; accordingly, the insulating layer is secured in position on the substrate as desired. However, if an abnormal force is applied to the screw fastener in the direction to urge it further into the opening in the substrate, it moves freely in that direction, compressing the resilient material during the application of such force, and upon subsequent removal of the abnormal force, the restoring force due to the resilience of the layer is sufficient to move the thread-free portion of the shank back again through the aperture in the substrate until such motion is again arrested by the inner end of the threaded portion of the shank. The screw fastener is thus adapted to reciprocate in the opening in the substrate in response to compression and reexpansion of the resilient layer in response to the application and removal of abnormal external forces, yet provides the desired securing action by which the layer is attached to the substrate.

In order to assure that the inward end of the threaded portion of the fastener provides a reliable stop against outward motion of the fastener, it is preferred to make the threaded portion of rolled threads such that the maximum diameter of the threads thus formed is inherently greater than the maximum diameter of the adjacent shaft or shank, or if cut threads are used for the threaded portion, then to provide a reduced diameter portion of the shank adjacent the inner end of the threaded portion so that again the maximum diameter of threads will be substantially greater than that of the adjacent shank.

In one preferred form of the invention, the screw fastener has an unthreaded or clear shank portion extending from beneath the head of the fastener to the beginning of the threaded portion at the tip end, the length of which unthreaded or clear shank portion is substantially equal to the sum of the thickness of the substrate, plus the normal thickness of the resilient layer and any associated material, plus the thickness of any plates or washer-like elements which are positioned under the head of the fastener.

In the method of providing the assembly of the invention, the screw fastener is advanced through the resilient layer and screwed through the substrate until the inner end of the threaded portion has passed completely through the substrate, at which point assembly is complete. In some cases the opening in the substrate may be prefabricated, in which case the fastener must be aligned with the corresponding opening during installation but need not be of the self-piercing type; in some cases the prefabricated opening may be provided with prefabricated threads, in which case the fastener may be of an ordinary screw type, rather than one having either self-piercing or self-tapping qualities. However, for ease and rapidity of installation, it is perferred to use as the fastener one which has both self-piercing and self-threading properties, so that no-preparation of the substrate is required and the fastener may be installed easily at any desired position.

BRIEF DESCRIPTION OF FIGURES

These and other objects and features of the invention will be more fully understood from a consideration of the following detailed description, taken with the accompanying drawings, in which.

DETAILED DESCRIPTION OF SPECIFIC EMBODIMENTS

Figure 1:
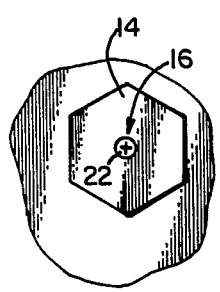
FIG. 1 is a fragmentary plan view, to reduced scale, showing one form of fastening assembly to which the invention is applicable.

Referring now to the specific embodiments of the invention illustrated in the drawings by way of example only, and referring first to the prior art arrangements of FIGS. 1–4, it is assumed that the substrate to which the thermal insulation is to be secured is a corrugated metal decking 10. The relatively thick layer of thermal insulation 12 is laid flat over the top of the decking as shown, and is secured thereto by means of the washer-like holding plate 14 and the screw fastener 16. With the screw in place, alternate layers of felt paper and hot mopping, such as 18 and 20 respectively, are applied over the top of the holding plate and the screw in the desired number of plies to form the appropriate thickness of built-up roof.

In this example of the prior art, the screw has a conventional head 22, an unthreaded main shank portion 24, a threaded portion 26, and a sharp, milled conical point 28 for piercing the roof decking nd extruding it radially outwardly until it mates with the threads of the screw, which threads begin substantially at the point where the conical head has expanded to its maximum shaft diameter.

Figure 2:
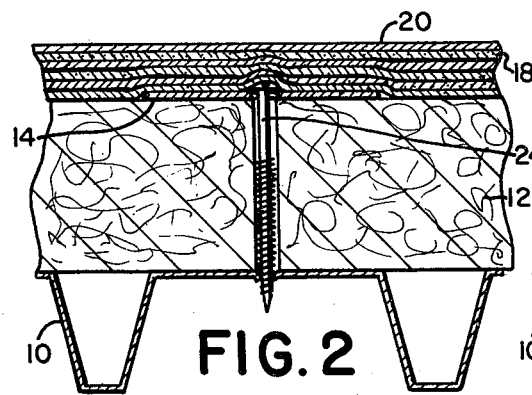
FIG. 2 is a fragmentary vertical sectional view of a type of assembly which was known in the prior art, under conditions in which the insulation layer is not under externally-induced stress.

The assembly of FIG. 2 is normally formed by laying down the thermal insulation layer 12, and then passing the screw through a central aperture in the holding plate 14, and then placing the screw in a suitable screw-fastening tool of known form, pressing the point of the screw downwardly through the insulation from the top and against the substrate while the tool rotates the screw rapidly, and continuing to urge the rotating screw downwardly until it pierces the substrate, extrudes the metal of the substrate somewhat radially outwardly, and causes the holding plate 14 to be held snugly against the top of the thermal insulation 12. The substrate material in this example is assumed to be sufficiently thin as to fit between the successive threads of the screw.

Figure 3:
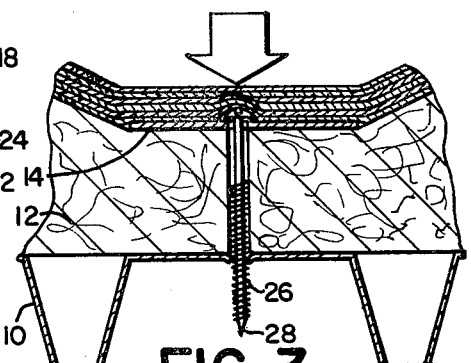
FIG. 3 is a view like that of FIG. 2, illustrating one possible type of response of a prior-art assembly to application of an external compressive force centered over the fastener.

Referring to FIG. 3, if the compressive force is applied to the top of the completed assembly at the position and in the direction indicated by the large arrow, as by the weight due to a workman's foot or to a wheel of a wheelbarrow or the like, the screw may respond by snapping downwardly through the opening in the substrate to the position shown in FIG. 3, with accompanying local compression of the thermal insulation as shown; upon removal of the externally applied force, the threads of the screw will catch in the adjacent sides of the opening in the substrate, and will prevent the resilient thermal insulation material from returning to its original relatively thick configuration of FIG. 2. This not only results in unevenness in the top surface of the roof assembly, but also reduces the thermal insulating properties of the compressed portion.

Figure 4:
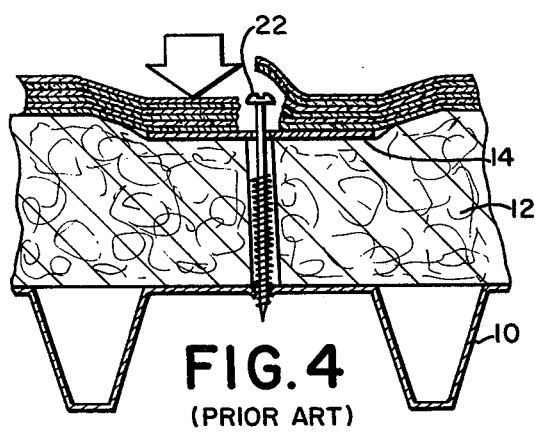
FIG. 4 is a similar sectional view illustrating a possible type of response of the prior-art assembly to application of an external compressive force applied adjacent but to one side of the head of the fastener.

Referring now to FIG. 4, there is illustrated a condition which can occur on such a prior art assembly which in many cases is even more serious. A force applied with the direction and location indicated by the large arrow, near but to one side of the head of the screw fastener, applies pressure downwardly against the holding plate 14 so that the thermal insulation material is compressed, but the screw, which is engaged in the opening in the substrate, does not move downwardly, and accordingly the head of the screw can pop upward through, and rupture, the roofing material above it as shown in FIG. 4. This provides the possibility of a serious water leak through the roofing, and is very undesirable.

Figure 5:
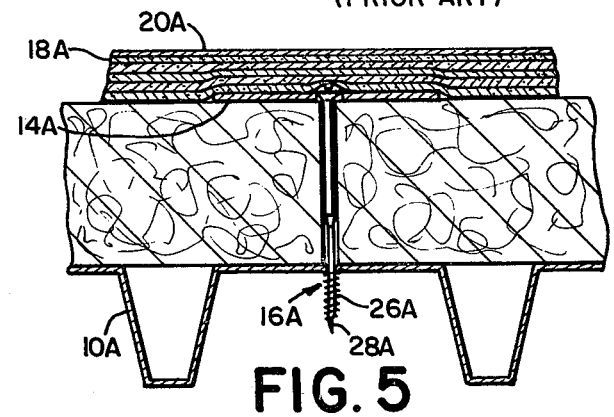
FIG. 5 is a fragmentary sectional view of an assembly according to one form of the invention, in the absence of externally-applied compressive forces.

Referring now to the assembly of the invention illustrated in FIG. 5, parts corresponding to those of FIGS. 1–4 are illustrated by corresponding numerals with the suffix A; the arrangement is substantially the same as that in FIGS. 1–4 with the exception of the construction and positioning of the screw designated by the numeral 16A.

As is shown especially clearly in FIG. 7, the screw may again have a conventional head 22A and a conventional conical piercing point 28A at the opposite end. However, the threads 26A are limited to a terminal portion of the shank 16A on the opposite side of the substrate 10A from the insulation layer 12A, and since the opening in the substrate 10A fits closely adjacent the root of the threads 26A, the threads constitute, in effect, a retaining element or nut which prevents the screw from pulling up again through the opening. In addition, the portion 50 of shank 24A extending upward from just above the end of the threads 26A is of reduced diameter compared with the remainder of shank 24A such that it may slide through the opening and substrate 10A easily and without enlarging that opening.

Figure 6:
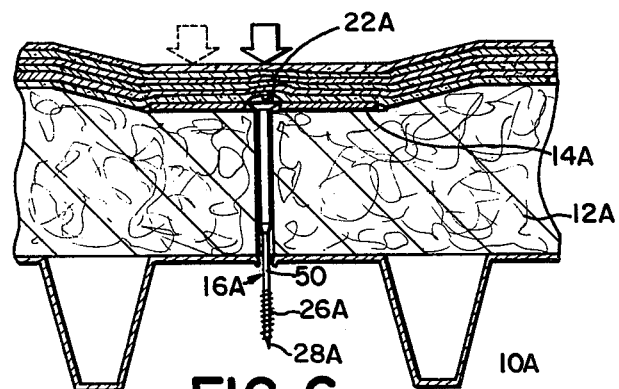
FIG. 6 is a similar view illustrating the response of the assembly of the invention to compressive forces applied to the top of the assembly, directly above or to one side of the head of the fastener.

The response of the screw assembly of the invention to external forces applied to the top of the roof is illustrated in FIG. 6. In that figure the full-line arrow indictes application of a downwardly directed external force directly over the center of the top of the screw fastener, while the arrow shown in broken line indicates the application of a similar force at a point slightly displaced from the axis of the screw fastener. In either case the top of the roofing moves downwardly, compressing the insulation 12A as shown, while the reduced diameter portion of the screw moves freely through the opening in substrate 10A. Because of this ease of axial motion, there is no relative force between the head of the screw and the membrane overlying it, and hence the breaking of the head of the screw upward through the covering layers illustrated in FIG. 4 does not occur in the arrangement of the invention shown in FIG. 6. Similarly, the reduced diameter of the screw fastener 16A at 50 permits it to slide easily upwardly through the opening in substrate 10 when the externally applied force is removed, so that the insulation layer can resume its original thickness when the force is removed, rather than being trapped in the reduced thickness condition as illustrated in FIG. 3.

Accordingly, the arrangement of the invention overcomes the drawbacks of the prior rt illustrated with respect to both FIG. 3 and FIG. 4.

Figure 7:
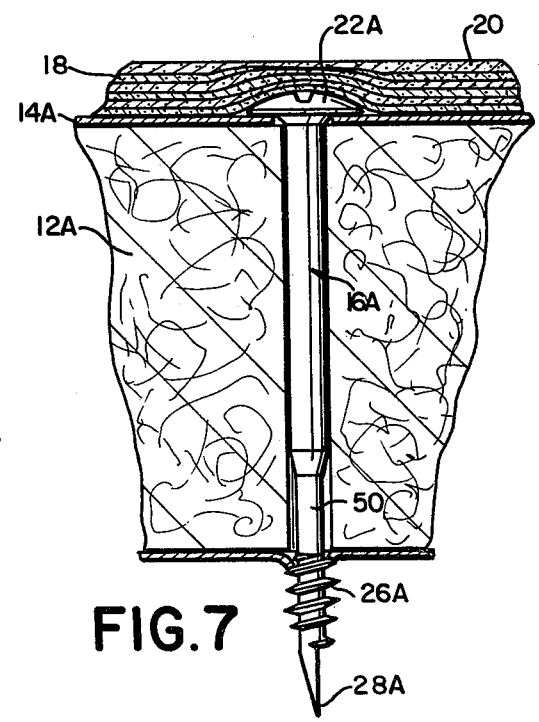
FIG. 7 is a fragmentary view of the assembly of FIG. 5, to a larger scale.

In a preferred method of fabrication of the fastener according to the invention, a headed screw blank having the larger diameter illustrated at 16a in FIG. 7 is provided, and pinched to a substantial point at its lower end by conventional pinch pointing techniques. In a preferred form the tip of the screw is also slotted by milling in a known manner. The threads 26A are preferably provided by a rolling procedure which causes the root diameter of the threads to be smaller than that of the original shank diameter, while the maximum diameter of the threads is larger than the original shank diameter. If this were all that were done, the full diameter of the upper portion of the shank would extend to the top end of the threads 26A, and such full diameter would not move easily through the aperture formed in the substrate 10 as desired, and if it were forced to reciprocate in that aperture would widen the aperture so as to reduce the ability of the threads to resist pulling upward through the opening.

Applicant has found that this may be overcome by reducing the diameter of the screw fastener immediately above the threads 26A, preferably to about the root diameter of the threaded portion of the screw, for a distance above the upper end of the threads corresponding to the maximum expected degree of compression of the insulation layer in response to external forces. Accordingly, upon compression and reexpansion of the insulation, the portion of the screw fastener which reciprocates through the opening of substrate 10A will be the reduced diameter portion 50, which will move easily through the latter opening and will not enlarge it. In this way the drawbacks of utilizing screw fasteners having a full diameter extending to the top of the threads is overcome. This reducing of the diameter may be provided by a cutting or grinding operation performed on the shank after the threads have been formed thereon.

Accordingly, there has been provided a screw fastener assembly for securing resilient insulation, a screw fastener suitable for use therein, and a method of installation and fabrication of the screw, which permit compression and reexpansion of the insulation without damage to the insulation or to an overlying roof, while maintaining satisfactory lift-off resistance.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. In a fastening system for securing a resilient layer of material to an underlying substrate by passing a screw fastener through said layer and screwing the threaded end thereof through an opening in said substrate, the improvement wherein:

said screw fastener comprises screw threads limited to the portion of the shank of said screw fastener which lies on the opposite side of said substrate from said resilient layer when said fastener is in position and said layer is in a normal thickness state, the portion of said shank extending through said opening into said layer being smooth and free of said threads, whereby upon application of abnormal forces to said fastener in the direction to compress said layer and move said screw fastener through said opening said free shank portion moves freely through said opening in one direction, and when said abnormal force is removed and said resilient material reexpands, said free shank portion can move freely in the opposite direction through said opening to permit such reexpansion of the layer.

2. The apparatus of claim 1, wherein said threads are of larger maximum diameter than the minimum diameter of said opening, and extend to a position immediately adjacent said substrate.

3. The apparatus of claim 2, wherein said threads adjacent said opening have a maximum diameter larger than the diameter of the unthreaded portion of said shank in and adjacent said opening.

4. The apparatus of claim 1, wherein said threads are rolled threads.

5. The apparatus of claim 1, wherein said threads are cut threads, and said shank has a reduced diameter portion immediately adjacent the inner end of said cut threads.

6. The apparatus of claim 1, comprising also a plate through which said screw fastener extends, and itself extending outward under the head of the fastener along the adjacent outer surface of the resilient layer.

7. In an assembly comprising:
a layer of resilient thermally insulating material;
a substrate on one side of which said layer is positioned, said substrate having an opening therethrough;
a screw fastener having a shank and a head, a portion of said shank remote from said head having threads thereon;
a centrally apertured plate disposed against the side of said layer opposite from said substrate;
said screw fastener extending through said layer and said substrate by way of the aperture in said plate and by way of said opening in said substrate, with the head of said screw fastener bearing against the outer side of said plate;
the improvement wherein said threads are located on a portion of said screw which is on the opposite side of said substrate from said layer, and terminate at a position adjacent said substrate when said substrate has its normal thickness, said threads adjacent said layer being of greater maximum diameter than said opening in said substrate, said shank being free of said threads at the position where it passes through said opening in said substrate and for at least a predetermined distance into said layer, whereby said layer is held to said substrate by said threads but said shank can move axially in said opening in response to abnormal compression and reexpansion of said layer.

8. A screw fastener, comprising:
a head portion, a shank portion and an end portion having a drill tip opposite from said head portion;
said end portion having screw threads thereon which terminate at said shank portion;
said shank portion, starting at said threads and for a predetermined distance therefrom, having a section of a reduced diameter less than that of the root of said threads adjacent thereto.

9. The fastener of claim 8 wherein the terminal end of said screw threads adjacent said reduced-diameter section of said shank has a surface substantially normal to the axis of said shank.

10. The fastener of claim 8, wherein said shank portion is unthreaded between said head and said screw threads on said end portion.

11. The fastener of claim 8, wherein said shank portion, from said reduced-diameter section to said head, is of a larger diameter than said reduced-diameter section thereof.

12. The fastener of claim 11, wherein said shank portion, from said reduced-diameter section to said head, is of substantially the same diameter as the diameter of said root of said threads.

13. An assembly comprising:
a substrate;
a layer of resilient material overlying said substrate;
a screw fastener having a head portion positioned adjacent the exterior of said layer of resilient material, a shank portion extending through said layer and said substrate, and an end portion positioned on the opposite side of said substrate from said layer;
said end portion comprising threads of larger maximum diameter than the maximum diameter of the opening in said substrate through which said shank passes;
said opening in said substrate having threads matable with said threads of said end portion to permit installation of said screw fastener by screwing thereof through said opening; and
a covering extending over the top of said screw fastener head and said layer;
said shank of said screw fastener having a threadfree portion, adjacent said screw threads on said end portion thereof, which is of lesser diameter than the minimum diameter of said opening, whereby said shank is free to reciprocate axially in said opening over a substantial range limited by the adjacent end of said threads on said end portion of said screw fastener.

14. The assembly of claim 13, wherein in the normal installed condition of said fastener free of substantial externally-applied forces, the terminus of said threads on said end portion lies contiguous the side of said substrate opposite from said layer.

15. The method of assembling a layer of resilient thermal insulation to a sheet metal roof deck, comprising:
providing a holding plate and a screw fastener extending loosely through said plate, said screw fastener having a head and a shank, a portion of which shank spaced from said head is threaded, the maximum diameter of said threaded portion being greater than the maximum diameter of the shank adjacent said threaded portion on the head side thereof;
assembling said layer of thermal insulation on said deck;
forming an opening in said deck beneath said layer of substantially the same diameter as the root diameter of said threaded portion;
passing said shank through said layer perpendicular to said deck and screwing said threaded portion through said opening until said threaded portion passes entirely through said opening;
whereby said threaded portion is prevented from moving upward through said opening but said shank adjacent said opening on the head side thereof is free to reciprocate in said opening in response to compression and reexpansion of said insulation layer.

16. The method of claim 15, wherein said shank is formed from a cylinder having a uniform diameter except near its pointed end, and comprising forming said threads by a thread-rolling operation, and removing from the portion of said cylinder adjacent the head side of said threads sufficient material to reduce the diameter to a dimension not substantially larger than the minimum diameter of said opening.

* * * * *

UNITED STATES PATENT AND TRADEMARK OFFICE
CERTIFICATE OF CORRECTION

PATENT NO. : 4,453,361
DATED : June 12, 1984
INVENTOR(S) : Tommy R. Hulsey

It is certified that error appears in the above-identified patent and that said Letters Patent are hereby corrected as shown below:

Column 5, line 64, "rt" should be --art--.

Signed and Sealed this

Sixteenth Day of July 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,453,361
DATED : June 12, 1984
INVENTOR(S) : Tommy R. Hulsey

It is certified that error appears in the above-identified patent and that said Letters Patent are hereby corrected as shown below:

Column 5, line 64, "rt" should be --art--.

Column 7, lines 39 and 40, "substrate" bridging lines 39 and 40 should be --layer--.

Column 7, line 41, "layer" should be --substrate--.

This certificate will supersede Certificate of Correction issued July 16, 1985.

Signed and Sealed this

First Day of October 1985

[SEAL]

Attest:

Attesting Officer

DONALD J. QUIGG

Commissioner of Patents and Trademarks—Designate